United States Patent
Gordon

(10) Patent No.: US 9,516,009 B2
(45) Date of Patent: Dec. 6, 2016

(54) AUTHENTICATING REDIRECTION SERVICE

(71) Applicant: TETRAPOD SOFTWARE INC., Seattle, WA (US)

(72) Inventor: Phillip Stewart Gordon, Shoreline, WA (US)

(73) Assignee: TETRAPOD SOFTWARE, INC., Seattle, WA (US)

( * ) Notice: Subject to any disclaimer, the term of this patent is extended or adjusted under 35 U.S.C. 154(b) by 43 days.

(21) Appl. No.: 14/499,252

(22) Filed: Sep. 29, 2014

(65) Prior Publication Data

US 2016/0094528 A1 Mar. 31, 2016

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 12/58 | (2006.01) | |
| H04L 29/12 | (2006.01) | |

(52) U.S. Cl.
CPC ............. *H04L 63/08* (2013.01); *H04L 51/00* (2013.01); *H04L 63/0807* (2013.01); *H04L 51/32* (2013.01); *H04L 61/301* (2013.01)

(58) Field of Classification Search
CPC .. H04L 61/2007; H04L 67/141; H04L 63/08
USPC .......................................................... 726/7
See application file for complete search history.

(56) References Cited

U.S. PATENT DOCUMENTS

| | | | | |
|---|---|---|---|---|
| 6,473,804 B1* | 10/2002 | Kaiser | ............... | H04N 21/2393 709/227 |
| 6,742,126 B1* | 5/2004 | Mann | ...................... | H04L 63/08 713/156 |
| 7,548,946 B1* | 6/2009 | Saulpaugh | .............. | G06F 9/547 709/203 |
| 7,954,144 B1* | 5/2011 | Ebrahimi | .............. | H04L 63/102 709/227 |
| 2004/0215824 A1* | 10/2004 | Payrits | .............. | H04L 29/12103 709/245 |
| 2006/0167841 A1* | 7/2006 | Allan | ................ | H04L 29/12009 |

(Continued)

OTHER PUBLICATIONS

C. D. Cranor; PRISM Architecture: Supporting Enhanced Streaming Services in a Content Distribution Network: Citeseer; year: 2001; p. 1-9.*

(Continued)

*Primary Examiner* — Monjour Rahim
(74) *Attorney, Agent, or Firm* — AEON Law; Adam L. K. Philipp

(57) ABSTRACT

A redirection service may receive a destination URI plus a set of conditions for reaching the URI. The conditions may include authentication conditions. The service may generate an intermediate URI which may direct to an intermediate service. The intermediate service may execute the various conditions, then redirect to the destination URI. In some cases, the intermediate service may pass data to the destination URI, and such data may include data gathered while executing the various conditions. The intermediate service may accessed through an Application Programming Interface (API). An example use scenario for the redirection service may be to generate publically publishable URIs for a private chat service, where an intermediate URI may be generated for a specific user or group of users, and may permit only those users to access a private chat room through the publically available URI.

21 Claims, 6 Drawing Sheets

(56) References Cited

U.S. PATENT DOCUMENTS

| | | | | |
|---|---|---|---|---|
| 2008/0189186 A1* | 8/2008 | Choi | .................. | G06Q 20/12 |
| | | | | 705/26.35 |
| 2009/0106252 A1* | 4/2009 | Chopra | .................. | H04L 67/02 |
| 2012/0072918 A1* | 3/2012 | Zhong | .................. | G06F 17/30887 |
| | | | | 718/104 |
| 2012/0239726 A1* | 9/2012 | Berfanger | ........... | H04L 67/2823 |
| | | | | 709/203 |
| 2014/0040993 A1* | 2/2014 | Lorenzo | .................. | G06F 21/41 |
| | | | | 726/4 |
| 2014/0101713 A1* | 4/2014 | Entin | .................. | G06F 17/30 |
| | | | | 726/1 |
| 2014/0173693 A1* | 6/2014 | Bikkula | ............. | H04L 63/0815 |
| | | | | 726/4 |
| 2014/0337321 A1* | 11/2014 | Coyote | ................. | G06F 3/0482 |
| | | | | 707/722 |
| 2015/0007199 A1* | 1/2015 | Valeva | .................. | G06F 9/546 |
| | | | | 719/313 |
| 2015/0074670 A1* | 3/2015 | Gerganov | ............. | G06F 9/5027 |
| | | | | 718/103 |
| 2015/0074743 A1* | 3/2015 | Ilieva | .................. | H04L 63/10 |
| | | | | 726/1 |
| 2015/0280965 A1* | 10/2015 | Kervadec | ........... | H04L 65/4084 |
| | | | | 709/203 |

OTHER PUBLICATIONS

Codegain.com, "Consuming URL Shortening Services", http://www.codegain.com/articles/csharp/miscellaneous/consuming-url-shortening-serivces.html, retrieved Sep. 27, 2014.

BIT.LY, "Consuming URL Shortening Serivces", http://c-sharpcorner.com/uploadfile/GemingLeader/consuming-url-shrtening-services.html, retrieved Sep. 27, 2014.

* cited by examiner

AUTHENTICATING REDIRECTION SERVICE

BACKGROUND

Uniform Resource Identifiers (URI) are a naming convention for resources that may be available over the Internet or other networks. A Uniform Resource Locator (URL) is a subset of a URI and may be commonly referred to as a web address, and a Uniform Resource Name (URN) is also a subset of a URI and provides a mechanism for identifying resources in a particular namespace. In general, URIs are a convention for accessing content across a computer network.

SUMMARY

A redirection service may receive a destination URI plus a set of conditions for reaching the URI. The conditions may include authentication conditions. The service may generate an intermediate URI which may direct to an intermediate service. The intermediate service may execute the various conditions, then redirect to the destination URI. In some cases, the intermediate service may pass data to the destination URI, and such data may include data gathered while executing the various conditions. The intermediate service may accessed through an Application Programming Interface (API).

A private chat system may use an authenticating redirection service to generate a publically-viewable URI. When a user follows the publically-viewable URI, an intermediate service may authenticate the user, and upon successful authentication, may pass a destination URI that establishes a private chat session. The authentication system may use authentication services provided by social networks, email verification, or other sources to verify the user's identity, and the private chat session may considered secure by reliance on the authentication made to the intermediate service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
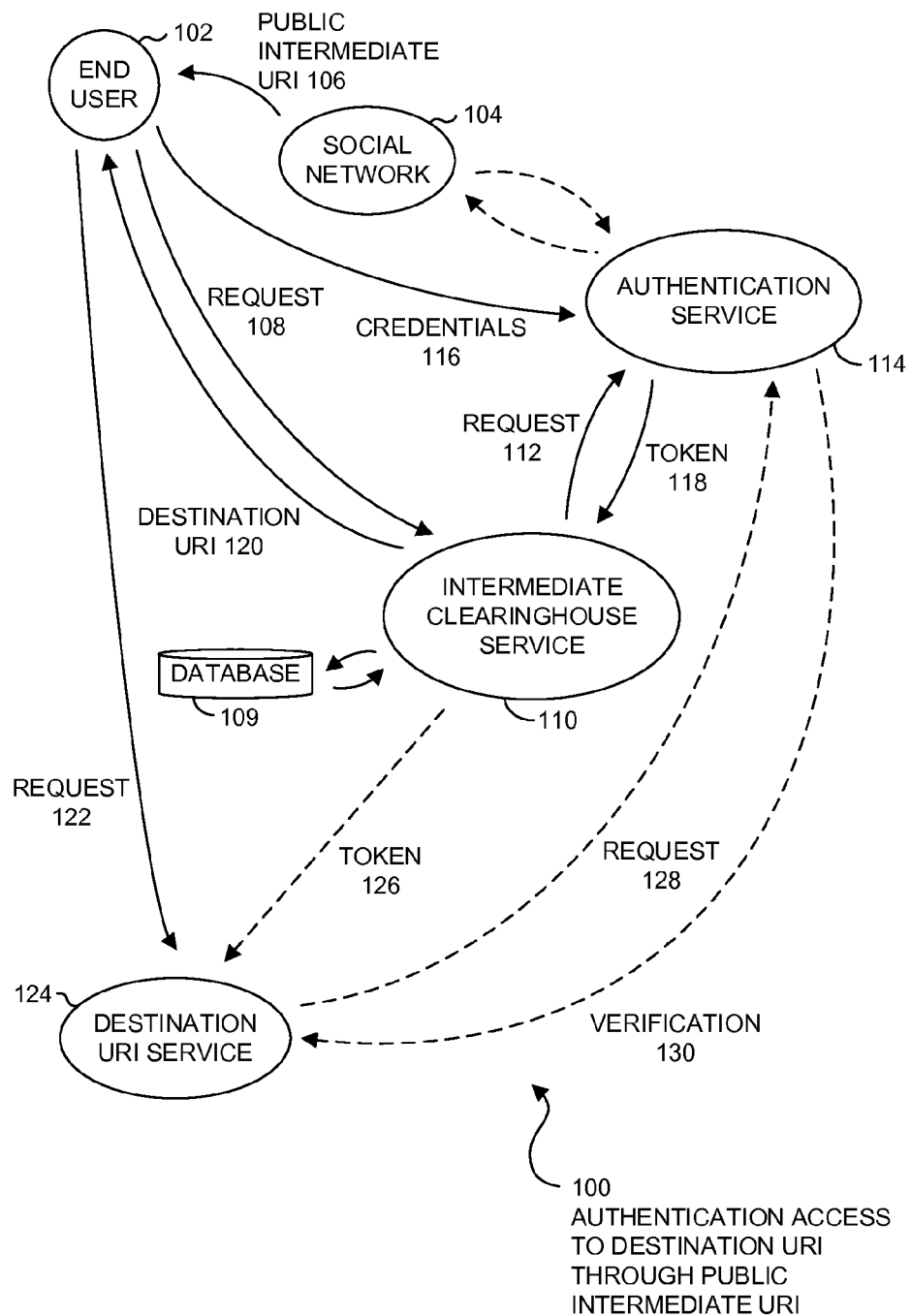
FIG. 1 is a diagram illustration of an example embodiment showing relationships and interactions for authenticated access to destination URIs.

A URI redirection service may use a set of conditions for permitting redirection from an intermediate URI to a destination URI. The set of conditions may include authentication, but may also include other data collection or data verification. The conditions may be active or passive to the user, meaning that the user may take an active role or provide requested input in authentication or other data collection, or the data collection may be passive in that a redirection service may collect or verify data without the user's interaction.

The URI redirection service may consist of two basic functions: creating an intermediate URI and processing a request for the intermediate URI. The creation step may receive the destination URI and conditions for accessing the destination URI, and may generate the intermediate URI. The destination URI and conditions may be stored in a database, along with the intermediate URI. Processing the request for the intermediate URI may be performed by an intermediate URI clearinghouse service, which may respond to the intermediate URI, perform various steps associated with the conditions, and return the destination URI.

The step of creating an intermediate URI may be performed by a URI creation service, which may receive a destination URI and a set of conditions for reaching the destination URI. The destination URI may be passed to the URI redirection service, which may return an intermediate URI. The intermediate URI may be published. In some cases, the URI may be published in a public forum, although the URI may permit access to the destination URI for only specified, authenticated users.

The URI creation service may receive a set of conditions for accessing a destination URI. In some cases, the set of conditions may be predefined, and in other cases a user may be able to select and define the conditions for accessing the destination URI. In one example, an application may have a user interface from which a user may select the types of conditions for accessing the destination URI and other configuration information. The application may pass the destination URI and conditions to a URI redirection service, which may be accessed through an API, and may receive back an intermediate URI. The intermediate URI may be passed to various users who may attempt to access the destination URI, and those users who meet the conditions may receive the destination URI and have access to a web page or other services at the destination URI.

The URI clearinghouse service may receive a request for a predefined intermediate URI, then determine a set of conditions for accessing the destination URI. The URI clearinghouse service may passively gather data for various conditions or may actively engage a user in generating the data. Once the conditions are satisfied, the destination URI may be returned to the user. When the conditions are not satisfied, the URI clearinghouse may return a different URI, which may be a default URI or a URI configured for requests that do not satisfy the conditions. In some cases, the URI clearinghouse may collect data and may create a URI containing the data, which may be passed to a service that may create a customized web page or take other customized action based on the data collected by the URI clearinghouse.

The URI clearinghouse service may provide authentication services prior to permitting access to the destination URI. The authentication services may involve communicating with one or more online social networks to receive authentication verification, verifying a user's identity through email or other mechanism, or other mechanism to verify identity.

In some cases, the URI clearinghouse service may obtain security tokens or other credentials that may be provided by a remote authentication service, then pass such tokens or credentials to a service that responds to the private URI. In some cases, the tokens may be passed through a secure or trusted communication back channel that may not be available to an end user. In other cases, some or all of the tokens may be embedded in a private URI that may be passed to the end user for access to the private service.

In still other cases, the URI clearinghouse service may generate its own security token, which may be passed to the service responding to the private URI. In such an embodiment, the private URI service may trust the tokens provided by the URI clearinghouse and may or may not have an ability to verify a user's credentials against a remote authentication service.

The combination of a URI creation service and a URI clearinghouse service may be implemented, distributed, and sold as a standalone service. In such an implementation, a service that may wish to provide privately-accessed services may outsource authentication to a company that may provide the URI creation/clearinghouse service.

Authentication services are typically improved and upgraded often, plus such services can be complex and difficult to implement and administer. Because authentication may be provided by many remote services, such as multiple social networks, email verification, mobile phone-based authentication, and other mechanisms, managing all of the various authentication mechanisms may be cumbersome and complex. By outsourcing such services to a URI creation/clearinghouse service, a website or similar service may not have to burden itself with such a time consuming and complex task as managing authentication, and may be able to better focus on their product and content.

A URI clearinghouse service may not give out a URI to an end user until the end user's credentials are verified, as well as fulfilling other conditions for accessing a private URI. In such a configuration, the service providing the private URI may perform no further authentication of the user when responding to a request for the private URI, other than receiving and verifying security tokens that may be received from the URI clearinghouse service.

A private chat system may use a URI redirection system to generate public URIs that may grant access to a private chat URI for authenticated users. In an example use scenario, a user may complain about a company's product or service in a public social network. The company may identify the user as having made the complaint, then use a URI redirection service to generate an intermediate URI to a private chat room. The company may publish the intermediate URI to the social network in a message to the user. The user may select the intermediate URI, which may then go through an authentication provided by a URI clearinghouse service. Once authenticated, a destination URI may establish a private chat session where the user's complaint may be aired privately and dealt with in a private, secure chat interface.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100, showing relationships and transactions that may occur when an end user 102 attempts to access a destination URI through an intermediate URI where the process uses authentication.

Embodiment 100 is merely one example of a mechanism that may have a public URI that is processed by an intermediate clearinghouse server 110 to authenticate a user, and once the user is authenticated, the user may be provided with a destination URI.

The mechanism may be used in many different scenarios where conditional access to a website, document, or other network-available resource. The mechanism may have a set of conditions that may be defined for access, and after meeting those conditions, an address for the network resource may be issued in the form of a URI.

One use scenario may be to limit access to a document to a single user or to a limited group of people. An intermediate URI may be generated that directs access to an intermediate clearinghouse service 110. The user who follows the intermediate URI may be asked to provide authentication credentials, and once those credentials are verified, the destination URI may be supplied to the user. The user may then have access to the document.

In another scenario, an application may have private communication channels, such as private chat rooms. A user of such an application may identify an end user with whom a private chat session may be desired. A publically accessible intermediate URI may be transmitted to the end user over an open network, such as a social network. The end user may follow the intermediate URI, and when that specific end user is authenticated, the URI for the private chat room may be provided. For other users who are not authenticated, an intermediate clearinghouse server may redirect to another URI.

An end user 102 may interact in a public forum, such as a social network 104 and may receive a public intermediate URI 106. The public intermediate URI 106 may be a URI that may be widely accessed, but may redirect to a destination URI service 124 only when a set of conditions are met. The redirection operations may be performed by an intermediate clearinghouse service 110.

In many cases, the public intermediate URI 106 may be distributed over a public forum, although in other cases, the intermediate URI may be distributed within a private network, such as an electronic mail network, intranet, or closed social network. In the latter cases, the system of embodiment 100 may provide a second layer of security within a relatively private network or environment.

The end user 102 may follow the public intermediate URI 106 using a browser or other network call. Such a request 108 may be serviced by an intermediate clearinghouse service 110, which may look up the intermediate URI from a database 109. The database 109 may contain conditions to meet prior to allowing access to a destination URI. As part of the conditions for access, the intermediate clearinghouse service 110 may send a request 112 to an authentication service 114. The end user 102 may be asked to supply credentials 116 to the authentication service 114, which may reply with an authentication token 118 to the intermediate clearinghouse service 110.

The example of accessing an authentication service 114 may be one example of a condition that may be met prior to granting access to a destination URI. Other examples of conditions may include affirmative actions that may be made by an end user. Such actions may include completing a survey or answering specific questions, paying a fee, or some other action.

Some conditions may be passive to the end user 102, where the end user 102 may not take affirmative action but where data may be gathered automatically and compared against conditions. For example, a set of conditions may include a time and location condition. In such an example, the end user's location may be retrieved from a geolocation service and compared against the expected or allowable locations of the user. The time of day or day of week conditions may also be evaluated to permit or deny access. Once the allowable conditions are met, the destination URI may be issued to the end user. The end user 102 may follow the destination URI in the form of a request 122 to the destination URI service 124.

In some cases, the conditions may generate or gather data that may be passed on to the destination URI service 124. For example, the results of a survey or other data gathering operation may be passed to a service that responds to the destination URI. In the example of embodiment 100, such results may be exemplified by an authentication token 126 that may be passed from the authentication service 114 to the intermediate clearinghouse service 110 to the destination URI service 124. The destination URI service 124 may then use the token 126 to verify authentication. In the same way, other data gathered by the intermediate clearinghouse service 110 may be passed to the destination URI service 124 without being passed to the end user 102.

In some cases, data gathered by the intermediate clearinghouse service 110 may be incorporated into a customized destination URI. For example, a destination URI may include parameters and values that may be added by the intermediate clearinghouse service. The parameters and values may be passed to the end user 102, then passed to the destination URI service 124 in the form of a request 122.

Figure 2:
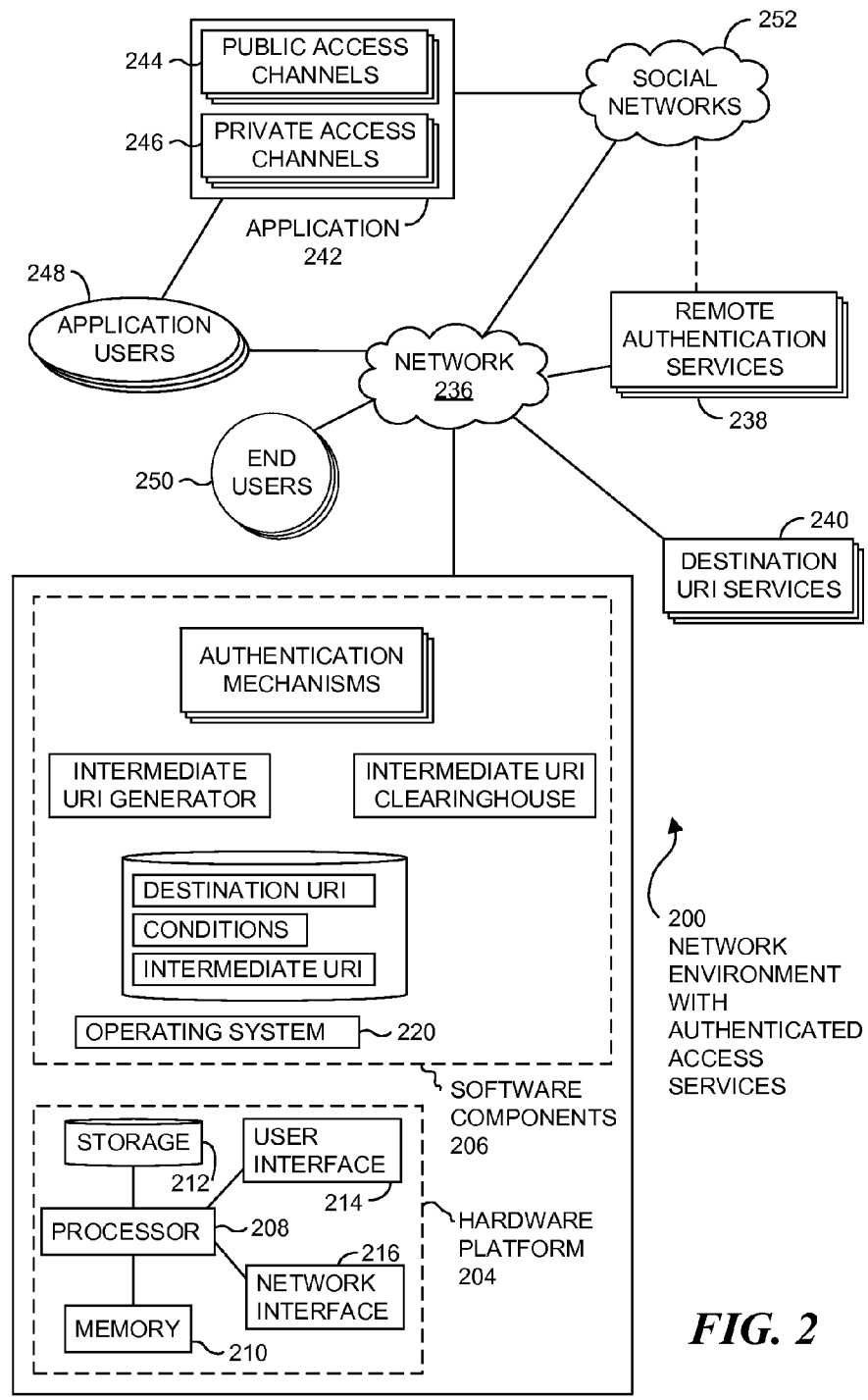
FIG. 2 is a diagram illustration of an example embodiment showing a network environment with an intermediate URI generator and clearinghouse.

FIG. 2 is a diagram of an embodiment 200 showing components that may generate and process intermediate URIs. The components of embodiment 200 may represent various components connected over a network architecture.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 220 on which various software components and services may operate. In the example of embodiment 200, the device 202 may operate both an intermediate URI generator 222 and an intermediate URI clearinghouse 232. The intermediate URI generator 222 may receive requests for intermediate URIs, create the intermediate URIs, and store information in a database 224. The database 224 may contain a destination URI 226, conditions 228 for handling an incoming request for an intermediate URI, and the intermediate URI 230.

An intermediate URI clearinghouse 232 may respond to an intermediate URI, process the various conditions, and return the destination URI when the conditions are met.

A set of authentication mechanisms 234 may be provided by the device 202. In some cases, a set of remote authentication services 238 may be used across a network 236. The authentication mechanisms 234 or remote authentication services 238 may include email verification services, two factor authentication services using email or mobile devices, password verification, membership in a social network, membership in a group within said social network, membership in a predefined group, providing a predetermined password, email ownership verification, mobile telephone possession verification, survey completion, or some other authentication mechanism.

The destination URI services 240 may be websites, document repositories, or other services that may be accessed through intermediate URIs serviced by the intermediate URI clearinghouse 232.

In one type of embodiment, the intermediate URI generator 222 and intermediate URI clearinghouse 232 may be a standalone business or service. In such an embodiment, the intermediate URI generator 222 may be accessed through an application programming interface (API) or other interface, generate an intermediate URI, then process the intermediate URI to return a destination URI. Such as standalone service may be useful to provide access limitations, restrictions, data collection, or other services on top of products distributed by a destination URI service 240. In such an embodiment, the service may be a convenient mechanism to limit distribution of certain content, provide authentication services for private communication channels, or collect data or distribute advertisements.

An application 242 may be a service that has public access channels 244 and private access channels 246. An example of such an application may be a company's customer management system. The public access channels 244 may contain webpages, forums, document repositories, and other network accessible resources. The private access channels 246 may be staffed with customer support agents who may help individual customers with their individual requests, such as configuring products, setting up payment accounts, dealing with individual issues, or other private interactions.

Application users 248 may contact an end user 250 and wish to establish a private access channel 246 with the end user 250. In a typical situation, an end user 250 may discuss a company's products or services in a social network 252, which may be a public or other forum. An application user 248 may detect that the end user 250 could use some direct help, possibly because the end user 250 may have said something negative about the company. Rather than discussing the end user's problems in a public forum, the application user 248 may generate an intermediate URI for a private chat room and send the intermediate URI to the end user 250 over the public social network 252. The end user 250 may follow the intermediate URI, have their credentials authenticated by the social network's remote authentication service 238, and receive a link to a private access channel 246. Once the private channel is established, the application user 248 may be able to discuss the end user's issues in private and provide personal customer support.

Figure 3:
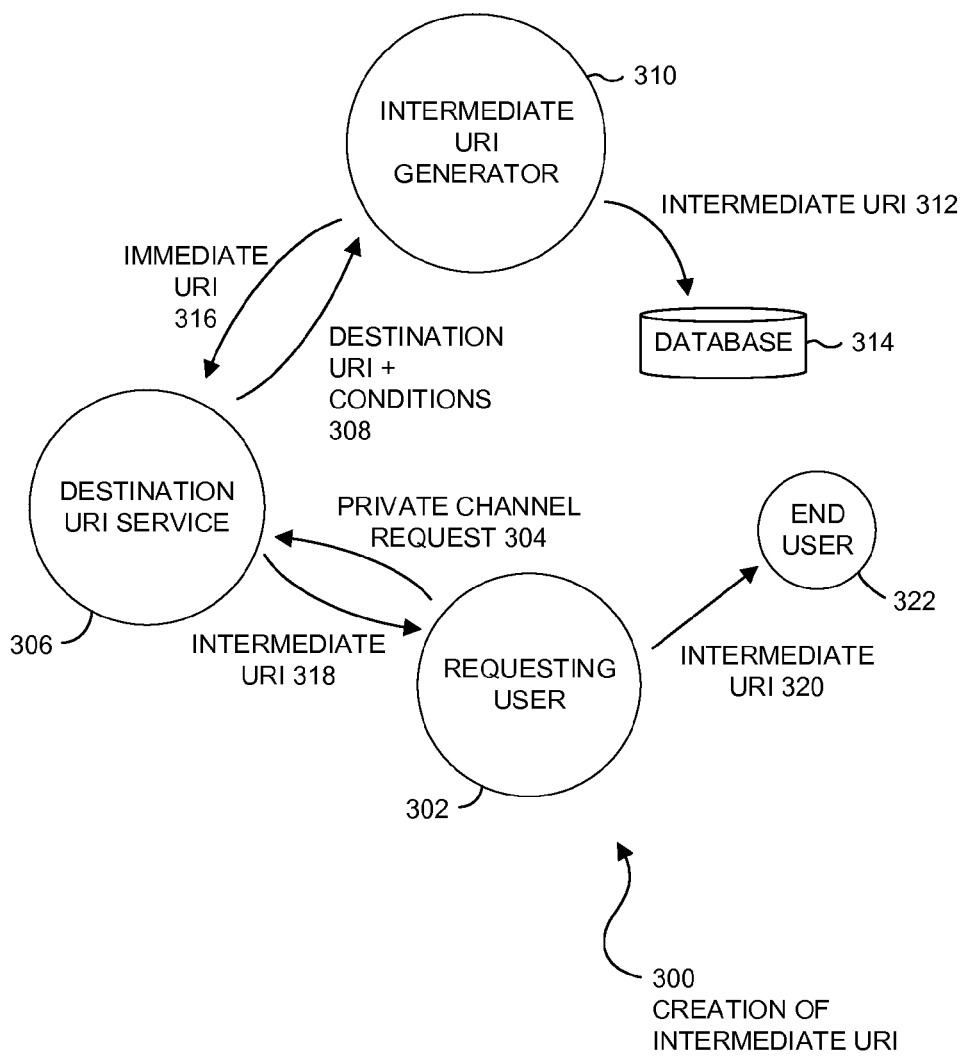
FIG. 3 is a diagram illustration of an example embodiment showing relationships and interactions for creating intermediate URIs.

FIG. 3 is a diagram illustration of an embodiment 300 showing a relationships and transactions that may occur to generate an intermediate URI. Embodiment 300 shows one mechanism by which a requesting user 302 may configure and request an intermediate URI, which may be passed to an end user 322. The end user may then follow the intermediate URI as described in embodiment 100 or other embodiments.

A requesting user 302 may be a user of a service, such as the application 242 of embodiment 200. Such an application may be represented in embodiment 300 as a destination URI service 306. The destination URI service 306 may be any application for which an intermediate URI may be desired.

The requesting user 302 may send a private channel request 304 to the destination URI service 306. The destination URI service 306 may generate a request for an intermediate URI that may contain a destination URI and set of conditions 308. The request may be transmitted to an intermediate URI generator 310.

The intermediate URI generator 310 may generate an intermediate URI 312, which may be stored in a database 314 for later use by an intermediate clearinghouse. The intermediate URI 316 may also be returned to the destination URI service 306, and forwarded as an intermediate URI 318 to the requesting user 302. The intermediate URI 320 may then be passed to the end user 322, who may follow the intermediate URI to access the destination URI service once the conditions may be met.

Embodiment 300 may be one example of an intermediate URI service. The intermediate URI generator 310 may configure an intermediate clearinghouse, which may assure that the conditions are met prior to providing access to a destination URI. In such an embodiment, conditional access to a network resource may be provided through an intermediate URI service and clearinghouse without having to provide the infrastructure for the authentication.

Figure 4:
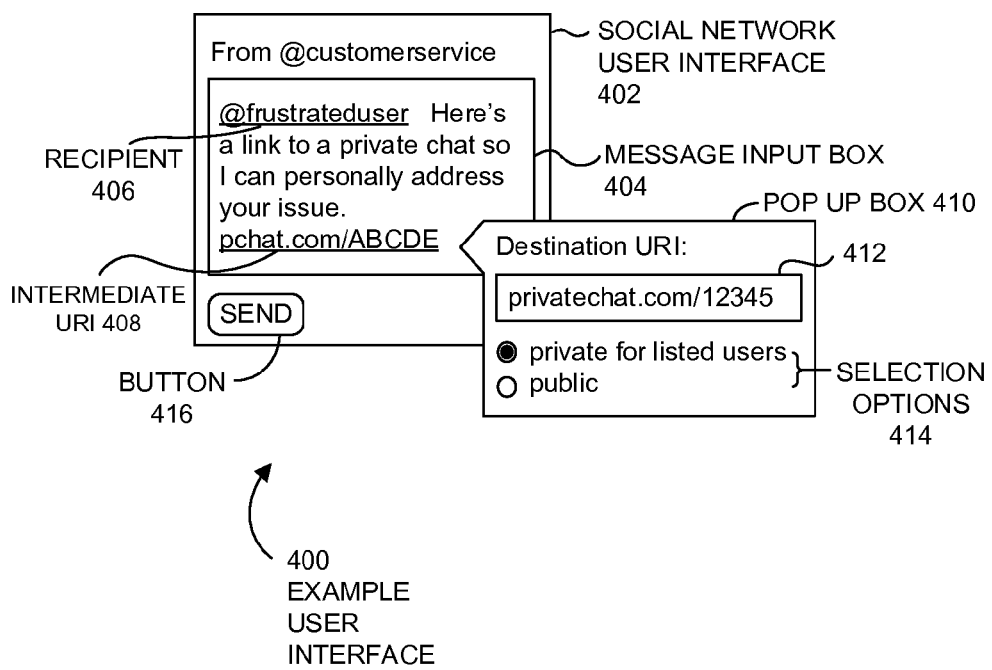
FIG. 4 is a diagram illustration of an example embodiment showing a user interface with intermediate URI generation.

FIG. 4 is an example user interface of an embodiment 400 showing a simple embodiment of an intermediate URI generator. The embodiment may illustrate an intermediate URI generator that may operate with a social network interface, and a user may be able to select whether to make a destination URI private for a specific user.

The example of embodiment 400 is simplified to illustrate merely one user experience that may be possible with an intermediate URI generator. More sophisticated user interfaces may be used, where a user may be able to define complex conditions for granting access to a destination URI. In some cases, an application may provide many more detailed conditions that may not be visible or changeable by a user.

A social network user interface 402 in the example may be viewed by a customer service representative. In a message input box 404, the customer service representative may mention a recipient 406, may include a note, and may include an intermediate URI 408. In the example, the customer service representative may send a note to the user "@frustrated user" asking the user to enter a private chat with the customer service representative.

The social network user interface 402 may be configured to detect when a URI may be created in the message input box 404. In this case, the customer service representative may have created a destination URI and pasted the destination URI in the message input box 404. The user interface 402 may have detected the destination URI and initiated the creation of an intermediate URI with a popup box 410.

The popup box 410 may be a user interface component that captures the destination URI 412 and presents options for the destination URI. In the example, the customer service representative may be given two selection options 414: whether to make the destination URI a private URI for the listed users or as a public URI. In the case of embodiment 400, the user selected private for the listed users.

The intermediate URI 408 may be placed in the body of the social network message in place of the destination URI, and the customer service representative may send the message by clicking on the button 416.

Figure 5:
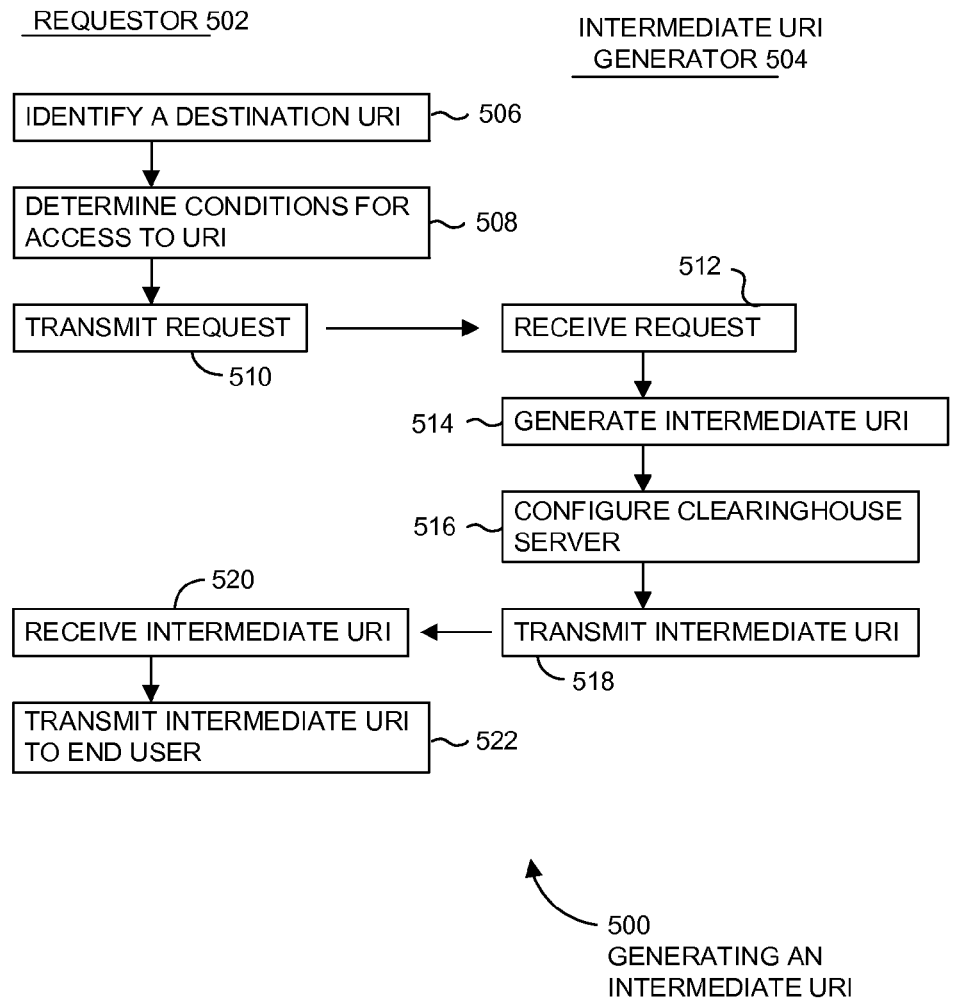
FIG. 5 is a flowchart illustration of an example embodiment showing a method for creating intermediate URIs.

FIG. 5 is a flowchart illustration of an embodiment 500 showing interactions between a requestor 502 and an intermediate URI generator 504. The operations of the requestor 502 are illustrated in the left hand column, while the operations of the intermediate URI generator 504 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 may illustrate a simplified interaction between a requestor 502 and an intermediate URI generator 504. The requestor 502 may be a human user, or may be an application or program. The intermediate URI generator 504 may be a website or other application that may have a user interface for human interaction, or may be an application programming interface (API) or other machine-only interface.

A requestor 502 may identify a destination URI in block 506. The destination URI may be automatically created by an application in many embodiments, such as with a private chat application in previous examples.

The conditions for accessing the destination URI may be determined in block 508. In many cases, the conditions may include authentication or some other action that may be taken by a user. The conditions may include various other conditions, such as user identity, device type or identity of a device being used to access the destination URI, physical location of an end user, time of day or day of week, membership in a social network, or some other conditions.

An example of a condition may be to permit access to those people who have a social network connection with the requesting user. In one such implementation, the intermediate URI clearinghouse may determine that a requesting user is not a follower or have a relationship with the requesting user. The intermediate URI clearinghouse may provide a user interface to the end user with a mechanism for establishing such a relationship, then may permit access to the destination URI. In another such implementation, end users with more than 10,000 followers in a social network may be permitted access to the destination URI while other end users may be given access to a different destination URI.

Another example of a condition may be to collect information that may be passed to the destination URI. For example, a condition may be to gather an end user's physical location and pass the physical location to the destination URI. In such a case, the destination URI may not necessarily be a secure or private URI, but the destination URI service may use the physical location to monitor incoming traffic or provide customization to the end user based on physical location. Such an example is a simplified example of using an intermediate URI service to gather information that may be difficult or cumbersome for a destination URI service to gather. In such a use case, an intermediate URI service may provide added value to a destination URI without a complex infrastructure.

The request for an intermediate URI may be transmitted in block 510 from the requestor 502 to the intermediate URI generator 504, which may receive the request in block 512.

The intermediate URI generator 504 may generate the intermediate URI in block 514, configure a clearinghouse server for to respond to the intermediate URI with the designated conditions in block 516, and transmit the intermediate URI in block 518.

The requestor 502 may receive the intermediate URI in block 520 and transmit the intermediate URI to the end user in block 522.

Figure 6:
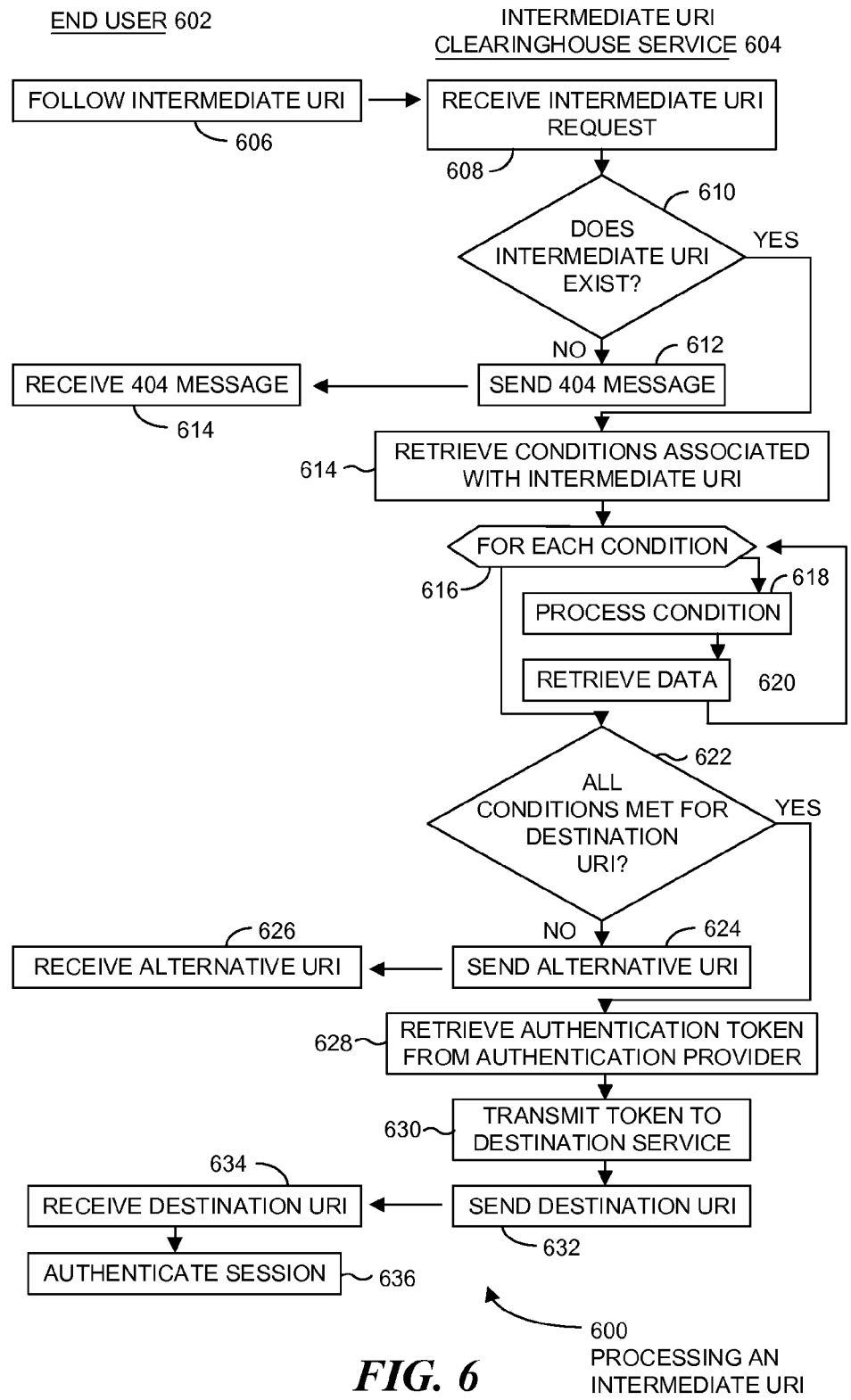
FIG. 6 is a flowchart illustration of an example embodiment showing a method for processing intermediate URIs to return destination URIs.

FIG. 6 is a flowchart illustration of an embodiment 600 showing interactions between an end user 602 and an intermediate URI clearinghouse 604. The operations of the end user 602 are illustrated in the left hand column, while the operations of the intermediate URI clearinghouse 604 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may illustrate a simplified interaction between an end user 602 and an intermediate URI clearinghouse 604. The end user 602 may be a human user, or may be an application or program. The intermediate URI clearinghouse 604 may be a website or other application that may have a user interface for human interaction, or may be an application programming interface (API) or other machine-only interface.

An end user 602 may request an intermediate URI in block 606. Such a request may be made across a network, which may direct the request to the URI clearinghouse, which may receive the request in block 608.

The intermediate URI clearinghouse may initially determine in block 610 if the intermediate URI exists. If the requested URI does not exist in block 610, a "404" message or other default response may be transmitted in block 612 and received by the end user 602 in block 614. If the requested URI does exist in block 610, the process may continue.

The intermediate URI clearinghouse 604 may retrieve conditions associated with the requested URI in block 614. Such a retrieval may be made from a database, such as the database 224 of embodiment 200.

For each condition in block 616, the condition may be processed in block 618 and data retrieved in block 620. In some embodiments, the conditions may be expressed in an algorithmic manner, such that a flowchart or set of sequential conditions or steps may be expressed. In other embodiments, the conditions may be expressed in a checklist or some other non-sequential manner.

If all of the conditions are not met in block 622, an alternative URI may be transmitted in block 624, which may be received by the end user 602 in block 626.

If all of the conditions are met in block 622, an authentication token may be received from an authentication provider in block 624 and transmitted to a destination service in block 630. The destination URI may be transmitted in block 632 and received by the end user 602 in block 634. The end user 602 may then request a service from the destination URI in block 636 and begin an authenticated session.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a first hardware platform having a hardware processor and electronic memory that contains code that can be executed by the hardware processor;
   said first hardware platform also including an intermediate Uniform Resource Identifier generator configured to:
      receive a destination Uniform Resource Identifier and a set of conditions for accessing said destination Uniform Resource Identifier;
      generate an intermediate Uniform Resource Identifier; and
      configure an intermediate Uniform Resource Identifier clearinghouse service to accept said intermediate Uniform Resource Identifier and resolve said set of conditions prior to providing said destination Uniform Resource Identifier so that said intermediate Uniform Resource Identifier clearinghouse service is thereby configured to return said destination Uniform Resource Identifier indicating a private secure Internet communications channel in lieu of a secondary Uniform Resource Identifier in the event that said set of conditions are met and so that said intermediate Uniform Resource Identifier clearinghouse service is thereby configured to return said secondary Uniform Resource Identifier in lieu of said destination Uniform Resource Identifier indicating the private secure Internet communications channel in the event that said set of conditions are not met.

2. The system of claim 1, said set of conditions comprising user authentication.

3. The system of claim 2, said user authentication comprising authenticating against a remote authentication service.

4. The system of claim 3, said intermediate Uniform Resource Identifier clearinghouse service further configured to:
   receive an authentication token from said remote authentication service and pass said authentication token to a destination service, said destination service receiving said destination Uniform Resource Identifier.

5. The system of claim 3, said intermediate Uniform Resource Identifier clearinghouse service further configured to:
   receive a first authentication token from said remote authentication service;
   generate a second authentication token in response to said first authentication token; and
   pass said second authentication token to said destination service.

6. The system of claim 1, said second intermediate Uniform Resource Identifier clearinghouse service operating on said first hardware platform.

7. The system of claim 1 further comprising:
   a second hardware platform;
   said intermediate Uniform Resource Identifier clearinghouse service operating on said second hardware platform.

8. The system of claim 7, said intermediate Uniform Resource Identifier generator further configured to:
   communicate with said intermediate Uniform Resource Identifier clearinghouse service using a secure communication channel.

9. The system of claim 1, said set of conditions comprising at least one of a group composed of:
   membership in a social network;
   membership in a group within said social network;
   membership in a predefined group;
   providing a predetermined password;
   email ownership verification;
   mobile telephone possession verification; and
   survey completion.

10. A system comprising:
    a first hardware platform comprising a hardware processor and electronic memory that contains code that can be executed by the hardware processor;
    said electronic memory including a public service that can be executed by the hardware processor and thereby configured to respond to unauthenticated Uniform Resource Identifier requests;
    said electronic memory also including a private channel generator that can be executed by the hardware processor and thereby configured to:
       generate a destination Uniform Resource Identifier for a private communications channel;
       transmit said destination Uniform Resource Identifier to an intermediate Uniform Resource Identifier service;
       transmit a set of authentication conditions to said intermediate Uniform Resource Identifier service;
       receive an intermediate Uniform Resource Identifier from said intermediate Uniform Resource Identifier service; and broadcast said intermediate Uniform Resource Identifier;

said electronic memory also including a private channel service that can be executed by the hardware processor and thereby configured to:
receive said destination Uniform Resource Identifier from an authenticated user; and
establish a private Internet communications channel with said authenticated user, wherein said private Internet communications channel is made secure by having received said destination Uniform Resource Identifier after said set of authentication conditions having been transmitted.

11. The system of claim 10, said private channel service further configured to:
receive an authentication token with said destination Uniform Resource Identifier; and
authenticate said authenticated user with said authentication token.

12. The system of claim 11, wherein said authentication token has been generated by and received from said intermediate Uniform Resource Identifier service.

13. The system of claim 11, wherein said authentication token has been generated by and received from a remote authentication service.

14. The system of claim 13, wherein said private channel generator is configured to broadcast said intermediate Uniform Resource Identifier over a first social network.

15. The system of claim 14, wherein said remote authentication service has been received from said first social network.

16. The system of claim 14, wherein said remote authentication service has been received from a second social network.

17. A method performed by a hardware processor, said method comprising:
receiving, by the hardware processor executing first code in an electronic memory, a request for an intermediate Uniform Resource Identifier;
determining, by the hardware processor executing second code in the electronic memory, a set of conditions associated with said intermediate Uniform Resource Identifier, said set of conditions defining access criteria for a destination Uniform Resource Identifier;
after determining the set of conditions, by the hardware processor executing third code in the electronic memory, either transmitting said destination Uniform Resource Identifier in response to determining that said set of conditions are met or transmitting a secondary Uniform Resource Identifier in response to determining that said set of conditions are not met, said destination Uniform Resource Identifier being a private secure Internet communications channel served by a destination service.

18. The method of claim 17 further comprising:
by the hardware processor executing fourth code in the electronic memory, either transmitting a security token and transmitting said security token to said destination service when said set of conditions are met or not transmitting the security token when said set of conditions are not met.

19. The method of claim 17 further comprising:
transmitting a link to a private chat interface in response to determining that said set of conditions are met, said destination Uniform Resource Identifier being said link to said private chat interface, wherein said private chat interface is made secure by said set of conditions having been met.

20. The system of claim 10, said private channel service also being configured to:
establish a private chat interface with said authenticated user as the Internet communications channel, wherein said private chat interface is made secure by having received said destination Uniform Resource Identifier after said set of authentication conditions having been transmitted.

21. The system of claim 1, said intermediate Uniform Resource Identifier generator also being configured to:
configure said intermediate Uniform Resource Identifier clearinghouse service to return said destination Uniform Resource Identifier indicating a private chat interface in lieu of a secondary Uniform Resource Identifier in the event that said set of conditions are met, the private chat interface being the private secure Internet communications channel and having been made secure by resolving said set of conditions prior to providing said destination Uniform Resource Identifier.

* * * * *